(No Model.)
T. W. SAMPLE.
FERTILIZER DISTRIBUTER FOR PLANTERS.
No. 506,552. Patented Oct. 10, 1893.
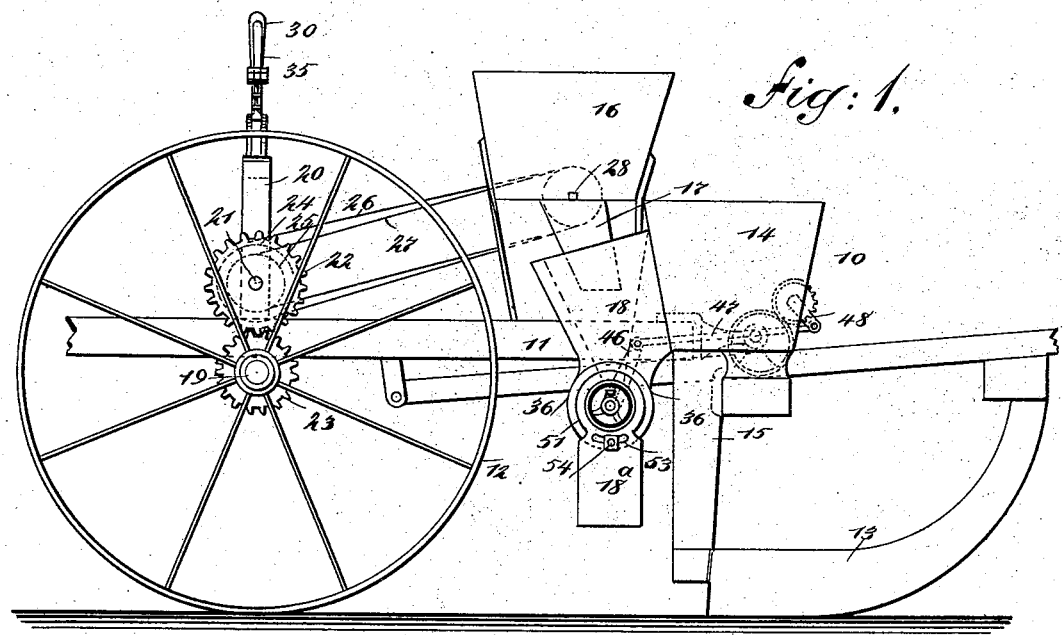
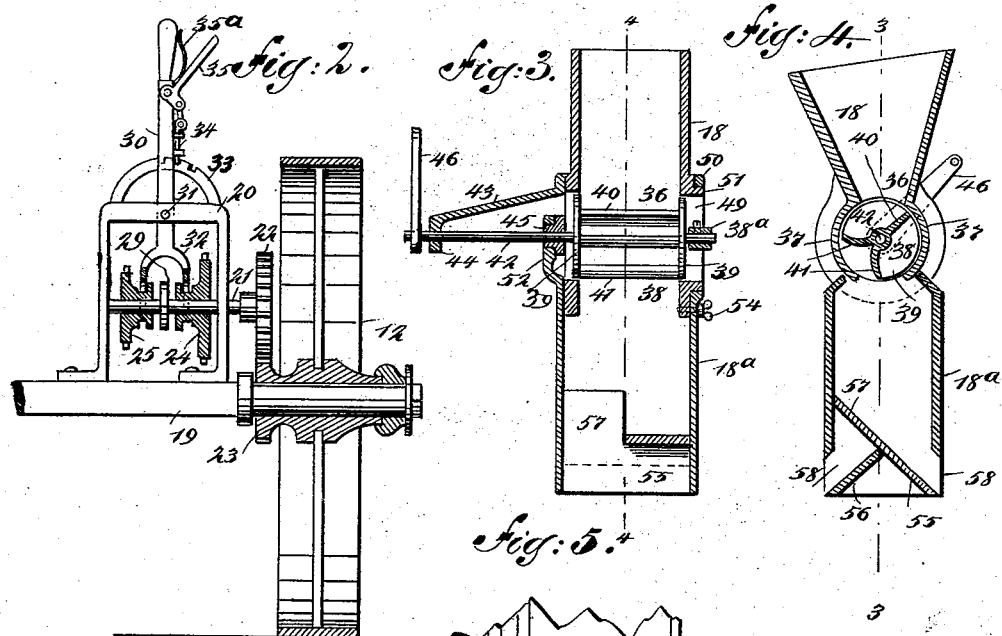
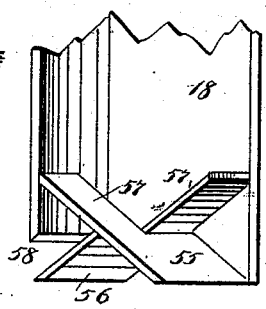
WITNESSES:
Chas. Nida.
C. Sedgwick
INVENTOR
T. W. Sample
BY
Munn & Co
ATTORNEYS.

UNITED STATES PATENT OFFICE.

THOMAS W. SAMPLE, OF NEW WASHINGTON, INDIANA.

FERTILIZER-DISTRIBUTER FOR PLANTERS.

SPECIFICATION forming part of Letters Patent No. 506,552, dated October 10, 1893.

Application filed April 13, 1893. Serial No. 470,242. (No model.)

*To all whom it may concern:*

Be it known that I, THOMAS W. SAMPLE, of New Washington, in the county of Clark and State of Indiana, have invented a new and Improved Fertilizer-Distributer for Planters, of which the following is a full, clear, and exact description.

My invention relates to improvements in that class of fertilizer distributers which are attached to planting machines and which are adapted to distribute the fertilizer at the time the seed is planted; and the object of my invention is to provide a distributer which will evenly distribute the fertilizer in front of and behind each hill of corn or sow it in drills if desired; to produce a valve which enables the feed of the fertilizer to be perfectly controlled, and to provide means for controlling the speed of the distributer so as to make it drop fast or slow as desired.

To these ends my invention consists in certain features of construction and combinations of parts, as will be hereinafter described and claimed.

Reference is to be had to the accompanying drawings, forming a part of this specification, in which similar figures of reference indicate corresponding parts in all the views.

Figure 1 is a side elevation of a planter provided with my improved distributing attachments. Fig. 2 is a broken detail sectional view showing the clutch mechanism for shifting the speed of the feed. Fig. 3 is an enlarged detail sectional view on the line 3—3 in Fig. 4, and shows the construction of the distributing valve and the swinging delivery spout. Fig. 4 is a vertical section on the line 4—4 in Fig. 3; and Fig. 5 is a broken perspective view of the inner portion of the fertilizer distributing spout and the divider which is arranged in the spout and which causes the fertilizer to be placed in front of and behind each hill.

The planter 10 may be of any usual construction and it is provided with the customary frame 11 which is mounted on wheels 12, and the planter has also the usual drill shoe 13 which is arranged in the front part of the machine and is adapted to open a drill. In the front portion of the machine is the usual seed box 14 in which the seed to be dropped is placed, and this box is provided with any approved dropping mechanism and has a delivery spout 15 which delivers the seed into the drill made by the shoe 13.

The above construction is not shown in detail, and the mechanism of the dropper is not illustrated, as any customary mechanism may be used.

Above and behind the seed box 14 is a fertilizer box 16 which has a delivery spout 17 adapted to deliver the fertilizer into a hopper 18, and the latter has a swinging spout $18^a$ which may be adjusted so as to drop the fertilizer in the right place in relation to the hills. The hopper, the swinging spout, and the valve controlling mechanism therein form a part of this invention, and will be described in detail hereinafter. The mechanism for feeding the fertilizer into the hopper 18 is not shown, however, as any customary revoluble feeding mechanism may be employed and a force feed if desired.

On the axle 19 of the machine is a bracket 20, in which is journaled, parallel with the axle 19, a shaft 21, and this connects by means of a gear wheel 22 with a gear wheel 23 formed on one of the main wheels 12. Any other suitable gear mechanism may be employed, however, for driving the shaft 21. On this shaft are held loosely sprocket wheels 24 and 25 which are of different sizes and which connect by means of chains 26 and 27 with similar sprocket wheels on the shaft 28 of the feed mechanism in the box 16. This mechanism is not shown in detail; and the sprocket wheels on the shaft 28 are arranged to align with the sprocket wheels 24 and 25 so that there is no need of showing them separately. The shaft 21 is provided with a friction disk or clutch 29 which is arranged between the sprocket wheels 24 and 25, and the sprocket wheels are thrown into engagement with the friction disk by means of a lever 30 which is fulcrumed on the bracket 20, as shown at 31 and which has a forked lower end 32, the fork connecting with the sprocket wheels, as shown clearly in Fig. 2. It will be seen then that by shifting the lever, either of said sprocket wheels may be thrown into engagement with the friction disk 29 so that the fertilizer feed mechanism may be driven fast or slow as desired. The lever 30 moves opposite a notched quadrant 33 on the top of the bracket 20, and on the lever is a slide bolt 34 arranged in substantially the usual way so as to engage the notches of the quadrant, and it is operated by a hand lever 35 which is fulcrumed on the lever 30 and is forwardly pressed by a spring $35^a$ so as to throw the bolt 34 into engagement with the quadrant. By means of the quadrant and slide bolt the lever 30 may be locked so as to hold either of the sprocket wheels against the friction disk 29 or so as to hold both wheels away from the disk, in which case the feed mechanism will be out of gear.

The hopper 18 of the distributer is reduced toward the bottom, as shown at 36, and then expanded so as to form a nearly cylindrical valve chamber 37 in which the feed valve 38 is pivoted. This valve has circular ends 39 which fill the end portions of the chamber 37, and the valve is composed of a radial flange 40 extending between the ends 38 and diverging curved flanges 41, which also extend between the end pieces 39, and the valve, by these flanges, it is thus divided into two pockets of equal size, these pockets being formed between the flanges 41 and the flange 40. The valve 38 oscillates and the flange 40 turns first beneath one edge of the hopper 18, and then beneath the other, and this causes first one pocket to be turned down and then the other, so that the pockets are thus alternately filled and emptied. Each of these pockets is adapted to contain the right quantity of fertilizer to be deposited at one time. When the fertilizer is to be dropped in a drill, the flange 40 is placed in a vertical position and held there, so that the fertilizer runs freely down over the two flanges 41. The valve 38 is held on a shaft 42 and is provided with a hub $38^a$ which is secured to the shaft by a set screw, and this construction enables the valve to be adjusted on the shaft so as to bring it into the right position beneath the bottom of the hopper 18. The shaft 42 is supported in a bracket 43 which is secured to one side of the hopper 18 and which has depending bearing portions 44 and 45 to support the shaft. The top of the bracket is closed so that it forms a housing for the shaft. The construction just described enables the shaft to be supported on one side of the hopper 18, so that if desired, the valve may be pulled out of the opposite side, as hereinafter described.

On the outer end of the shaft 42 is a crank 46 which connects by a pitman 47 with a crank 48 on one of the revoluble shafts of the dropper contained in the box 14, and it will be understood that any suitable operative connection may be made between the crank 46 and a movable portion of the planter so long as the connection enables the shaft 42 to be oscillated at the right time. The hopper 18 is open at one side opposite the valve 38, as shown at 49 in Fig. 3, to enable the valve to be easily taken off the shaft 42 when necessary or to be adjusted longitudinally on the shaft.

The spout $18^a$ which hangs below the valve 38 is adapted to be adjusted back and forth in relation to the dropper spout 15, so as to deliver the fertilizer in the required place. On its top and on one side is an annular flange 50 which turns on a flange 51 on the hopper 18, the latter flange 51 being formed around the opening 49 in said hopper. On the other side the spout $18^a$ has an upwardly extending arm 52 which is pivoted on the bearing 45 of the shaft 42. In the spout $18^a$, beneath the valve, is a curved slot 53 through which extends a thumb screw 54, the thumb screw extending into the lower portion of the hopper 18, as shown in Fig. 3, and by means of the thumb screw the spout $18^a$ may be fastened in a fixed position. In the lower end of the spout $18^a$ is a divider consisting of cross chutes or plates 55 and 56, the lower ends of which extend the entire width of the spout, but near the center the plates are crossed and cut away, their upper ends 57 being extended only partially across the spout and in this way two oppositely-inclined chutes are formed, and the fertilizer which drops through the spout, will thus be caught by the divider and part of it will descend over the plate 55, while the other portion will slide off the plate 56 and in this way the fertilizer is dropped in front of or behind corn or other seed in a hill. At its lower end and on the front and rear sides, the spout $18^a$ is cut away at 58 so that no obstruction is offered to the free delivery of the fertilizer from the plates 55 and 56. When the machine is used, the seed is dropped from the spout 15 in the usual way, and the fertilizer is delivered from the box 16 into the hopper 18, the rate of supply being regulated by the clutch-controlled sprocket mechanism described above, and as the machine moves, the revolution of the crank 48 actuates the pitman 47 and oscillates the crank 46, so that the valve 38 is also oscillated and the fertilizer is dropped first from one pocket of the valve and then from the other.

It will be understood that the divider in the spout $18^a$ may be dispensed with if desired, and that a rigid spout may be substituted for the swinging one, without departing from the principle of my invention.

Having thus described my invention, I claim as new and desire to secure by Letters Patent—

1. In a fertilizer distributer, the combination with the feed mechanism, of a driving shaft, different sized sprocket wheels mounted loosely on the shaft, an operative connection between the sprocket wheels and the feed shaft, and a clutch mechanism to throw either of said sprocket wheels into operation, substantially as described.

2. In a fertilizer distributer, the combination with the feed mechanism, of a driving shaft, sprocket wheels of different sizes held to slide on the shaft, a friction disk arranged between the sprocket wheels, and a clutch lever adapted to throw the sprocket wheels into and out of engagement with the friction disk, substantially as described.

3. The combination with the hopper having a valve chamber open at its ends and a flange concentric with one end and a bracket having a bearing at its opposite open end, and the valve in said chamber, of a spout having annular bearings turning on said flange and bracket bearing and also having a curved slot and an adjusting screw extending through said slot substantially as set forth.

4. In a fertilizer distributer, the combination with the fertilizer hopper having a valve-chamber at its lower end, said chamber being open at both ends of an oscillating valve mounted in the chamber, the valve having circular end pieces, filling the open ends of said chamber a radial flange connecting the end pieces, and diverging flanges arranged also between the end pieces but on the opposite side of the center of the radial flange, substantially as described.

5. The combination with the fertilizer hopper, of a swinging spout pivoted or journaled upon the lower end of the hopper, and an oscillating valve arranged between the spout and hopper and provided with pockets adapted to deliver fertilizer into the spout, substantially as described.

6. The combination with the fertilizer hopper having a side opening near its lower end and on one side and a bracket on the other side, of an oscillating shaft supported in the bracket, and a valve carried by the shaft, the valve being adapted to slide through the opening in the hopper and having fertilizer distributing pockets thereon, substantially as described.

7. The combination with the fertilizer delivery spout, having a single longitudinal passage through it and having opposite lateral openings 58, 58 in its lower end, of the divider arranged in said spout and consisting of oppositely inclined and crossing plates, each plate being cut away at its upper portion and extending entirely across the spout at its lower end, to the lower ends of the openings 58 substantially as described.

THOMAS W. SAMPLE.

Witnesses:
JOSEPH MOORE,
JOHN E. MOORE,